July 3, 1951
O. J. POUPITCH
2,559,570
DRIVE FASTENER
Filed May 17, 1946
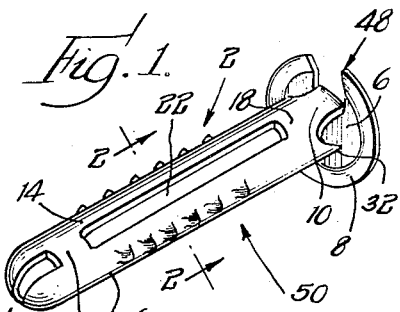
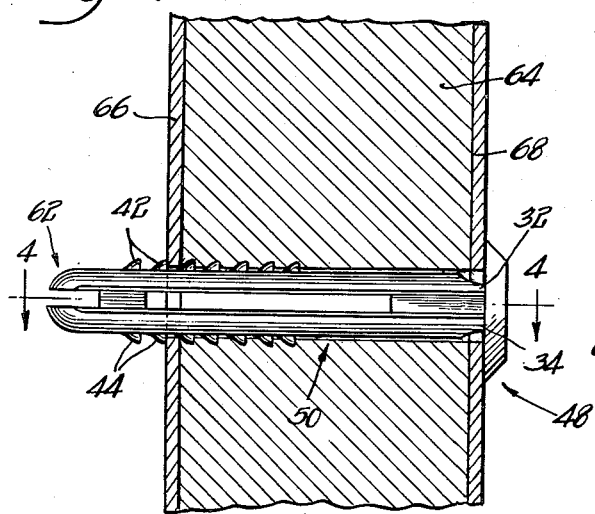
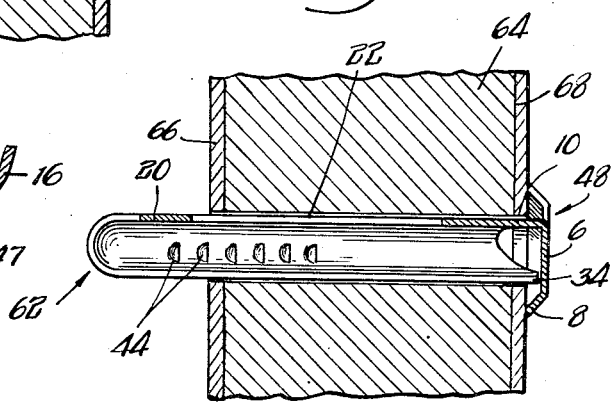
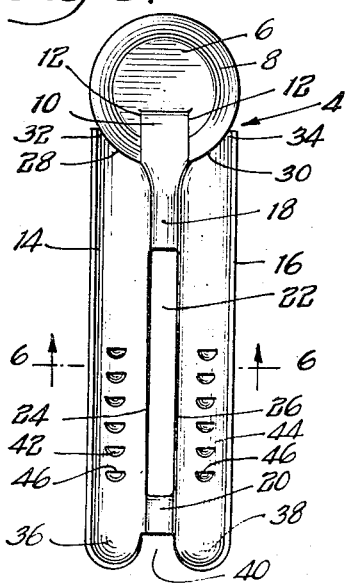
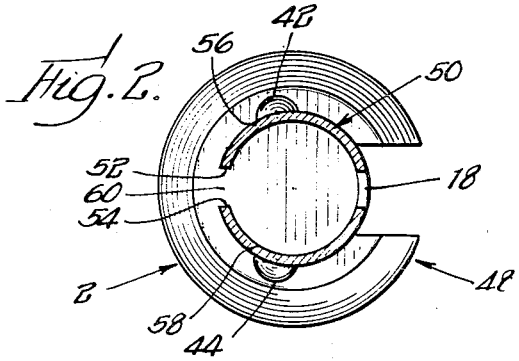
INVENTOR.
Ougljesa Jules Poupitch
BY
Moore, Olson & Trexler
attys Patented July 3, 1951

2,559,570

UNITED STATES PATENT OFFICE 2,559,570

DRIVE FASTENER

Ougljesa Jules Poupitch, Chicago, Ill., assignor to Illinois Tool Works, Chicago, Ill., a corporation of Illinois Application May 17, 1946, Serial No. 670,611

4 Claims. (Cl. 85—5)

This invention relates to fastening devices and has for its object the provision of a new and improved form and arrangement of parts in devices of this type which is particularly adapted to be made from sheet metal.

The invention contemplates a drive fastener particularly adapted for securing compressible insulation material, or other pads of substantial thickness, to an apertured panel or support, or between two panels. More particularly, the invention contemplates a one-piece sheet metal fastener which is easier to insert through compressible material, or other pads of substantial thickness, to secure it to a subjacent panel, which is more effective in securing the compressible material or other pad to the panel, and which is so constructed as to have substantial advantage in regard to strength, holding power, ease and cheapness of manufacture and adaptability for use under different conditions and with workpieces or parts of different thicknesses.

The new and improved device by which the several objects have been attained comprises a single piece stamped from flat sheet metal and so shaped as to provide rugged head and shank sections, of which the head is additionally strengthened by portions of the shank section so as to facilitate the driving of the fastener into its work clamping position, and of which the shank has a split entering or pilot end and substantially semi-circular shank sections which may be diametrically flexed by the pilot or entering end, and are provided with rigid tongues, teeth or projections which are so disposed in the generally semi-circular shank sections as to eliminate or minimize their interference with the easy insertion of the fastener in the workpieces.

The fastener is preferably formed from sheet metal stock with an elongated body portion or shank in tubular form so as to provide a maximum of strength and holding power, the shank being split longitudinally along one side to prevent diametral flexure or collapse of the diametrically opposed parts of the tubular shank and provided along the opposite side with one or more spaced slots or openings extending longitudinally of the shank to facilitate the diametral flexure of the shank parts, and yet to provide sufficient resilience to oppose such flexure and firmly grip the workpiece.

It is another object of the invention to improve devices of this type in sundry details hereinafter pointed out. The preferred means by which the several objects have been obtained are illustrated in the accompanying drawing, in which—

Figure 1 is a view in perspective of a new and improved fastening device embodying the present invention;

Figure 2 is a cross section taken along the line 2—2 of Figure 1;

Figure 3 is a view in section showing the fastening device in position to secure a dash silencer or insulating pad to a dash panel and an overlying or clamping panel;

Figure 4 is a view in section taken along the line 4—4 of Figure 3;

Figure 5 is a plan view of a sheet metal blank in which the fastening device of Figures 1 to 4 may be readily formed; and Figure 6 is a view in section taken along the line 6—6 of Figure 5.

The new and improved fastening device 2 (Figures 1 to 4) is preferably formed from a blank 4 (Figures 5 and 6) which is stamped from a strip or plate of sheet metal by any suitable method or apparatus. The blank 4 has at one end a preferably circular portion or disk 6 provided with an annular frusto-conical rim 8. The disk 6 is joined to the elongated body portion of the blank by a neck portion 10 which extends into the disk and is formed by spaced incisions or cuts 12 made in the end portion prior to the forming of the rim 8.

The elongated body portion of the blank comprises substantially semi-cylindrical wings 14 and 16. The wing sections are joined by integral connecting pieces or straps 18 and 20, the number and spacing of which determine the resistance of the fastener to diametral flexure, as will presently appear. The spacing of these straps forms a slot 22 between the longitudinal edges 24 and 26 of the wing sections. The end portion 6 is formed from the wing sections by arcuate incisions or cuts 28 and 30 on opposite sides of the neck portion 10. These arcuate incisions or cuts form at the upper end of the wing sections outwardly extending wing parts or abutment means 32 and 34 for purposes presently to be described.

The lower end portions 36 and 38 of the blank are not only curved transversely, but are also curved longitudinally so as to form part-spherical portions below the strap 20, and separated at their inner edges by the slot 40.

The wing sections are provided, adjacent to, but above the level of the strap 20, with rigid teeth, tongues or projections 42 and 44 which are formed by incising or cutting the sheet metal along straight lines 46 perpendicular to the longitudinal edge or axis of the blank and then pressing or stamping the material outwardly below the slot or cut so that each tooth is integrally attached to the sheet metal on its sides as well as its bottom edge and is, therefore, rigid and unyielding.

As best shown in Figure 6, each set of teeth 42 and 44 is centralized about a line or plane 47 which is offset from the axis 49 of the substantially semi-cylindrical wing sections 14 or 16, for purposes which will presently appear.

In order to form the fastener 2 from the blank 4, the latter is subjected to bending operations so that the disk 6, with its frusto-conical rim 8, forms the head 48 perpendicular to the neck portion 10. The wing sections 14 and 16 form a tubular shank 50 having the free edges 52 and 54 (Figure 2) of its shank sections 56 and 58, corresponding to the wing sections 14 and 16 of the blank, spaced apart to form a slot 60 between them so that the shank sections may flex diametrically toward each other against the resistance offered by the connecting straps 18 and 20.

It will be evident that the greater the number of connecting straps 18 and 20, or the greater the length of the straps, the greater will be the resistance offered to the diametral flexure of the shank sections and, conversely, the fewer and shorter the connecting straps, more readily will the shank sections flex or yield.

The part-spherical end portions 36 and 38 form a split, substantially semi-spherical entering end 62 which, therefore, serves as a pilot to center the shank of the fastener in the opening of the workpiece as the fastener is pressed or driven into the opening.

As shown best in Figure 2, the rigid teeth 42 and 44 are offset from a diametrical plane and displaced toward the free edges 52 and 54 of the shank sections. This diametrical offsetting of the teeth facilitates the easier entrance of the fastener into the workpiece because a smaller inward retraction of the teeth, and hence a smaller inward diametral flexure of the shank sections, is required to clear the wall of the opening in the workpiece.

As shown in Figures 3 and 4, the fastener 2 may be utilized to clamp the compressible insulating material or relatively thick pad 64 to a dashboard plate or panel 66 and between that panel and a clamping or covering panel 68. The pad 64 and the panels 66 and 68 are provided with alignable openings or apertures to receive the shank 50 of the fastener 2.

The fastener 2 is first introduced into the opening in the panel 68, the pilot or entering end 62 properly positioning the fastener with respect to that opening. As the fastener is pressed or driven inwardly, the teeth 42 and 44, engaging the wall of the opening in the panel 68, act as cams to cause diametral inward flexure of the shank sections 56 and 58 against the resistance of the interconnecting straps 18 and 20. Since this inward retraction of the rigid teeth 42 and 44 is reduced to a minimum (consistent with their subsequent gripping of the panel 66) by their offsetting, they offer a minimum of resistance to the pressing or driving of the fastener through the openings in the panel 68, the pad 64 and the panel 66.

During the pressing or driving of the fastener into its final applied position, the abutment means 32 and 34, formed at the upper end of the shank sections, support the head 48 of the fastener and, therefore, prevent shearing of the head from the shank or its deformation to such an extent that the head will not seat in a flush-tight relation to the workpiece or cover panel 68. By reason, however, of the fact that the head is joined to the shank on one side only of the shank, it is yieldable with respect to the shank to accommodate itself to the surface of the workpiece or panel 68. Thus, if by misalignment of the openings in the workpieces, panels or pads, the shank section should be inclined somewhat to the plane of the outer workpiece or cover panel, the head of the fastener will nevertheless lie in flush-tight, water-sealing relation to the surface of that workpiece or panel.

The fastener is pressed or driven inwardly until the head thus contacts the outer surface of the workpiece or cover panel. In final applied position, as shown in Figures 3 and 4, the rigid teeth 42 and 44 are urged outwardly by the tension created in, and the resilience of, the connecting straps 18 and 20, to cause the head-facing shoulders of the teeth to be projected over the peripheral edge of the opening in the supporting workpiece or panel 66. Since the tongues are rigid and unyielding, they prevent any axial movement of the fastener and, hence, any separation of the fastener parts. The tension created in, and the resilience of, the connecting straps 18 and 20, coupled with the fact that the shank is tubular, cause the fastener firmly to grip the workpiece or panel 66, and prevent lateral vibration of the fastener in the opening in the workpiece.

The plurality of tongues 42 and 44 make it possible for the fastener properly to secure pads of different thicknesses. As the fastener is driven to final position, the pad 64 may be compressed and the teeth, therefore, make it possible to secure the proper rigidity of fastening regardless of the extent to which the material or the pad is compressed. The semi-spherical shape of the entering end 62, which projects from the inner side of the supporting piece or dash-panel 66, eliminates any possibility of injury to the men—production men or repair mechanics—working in the vicinity of these fasteners. Injury to such men has been one of the common causes of complaint against the use of bolts or other types of spring fasteners heretofore employed in the trade to secure silencer pads to the dash-panels of automobiles.

It will thus be seen that the invention provides a fastener which is particularly adapted for securing compressible material or pads of substantial thickness to an apertured panel or support; which is easy to insert; and which is so constructed as to have substantial advantage in regard to strength, holding power, ease and cheapness of manufacture, and adaptability for use with workpieces or parts of different thicknesses.

While certain specific embodiments have been disclosed herein, it will be apparent that the invention is by no means limited to the details of construction herein disclosed but is capable of other modifications and changes without departing from the spirit and scope of the appended claims.

This invention is hereby claimed as follows:

1. A fastener comprising an elongated sheet metal shank having an entering end portion and including a pair of longitudinal relatively rigid shank sections of arcuate transverse shape with the concave sides thereof facing inwardly in opposed relation, a head integral with said shank and enlarged with respect to the shank circumference and bent transversely of the shank to overlie the space within the shank sections and project laterally thereof, a plurality of longitudinally spaced strap elements connecting one pair of opposed margins of said shank sections, one of said strap elements connecting said shank sections adjacent the head end portion and another of said strap elements connecting said shank sections adjacent the entering end portion, the longitudinal space between said strap elements and the rigidity of said sections effecting the bodily shifting of the shank sections as individual units about the longitudinal axis of the fastener in the vicinity of the entering end as the shank sections are subjected to transverse compressive stress from the wall of the aperture of a work piece, the other opposed margins of said shank sections over a substantial portion of the shank length being circumferentially spaced, and a plurality of relatively rigid work engaging projections extending outwardly from the periphery of a shank section and positioned intermediate the opposite longitudinal margins of said shank section in a substantially central portion thereof.

2. A fastener as claimed in claim 1, wherein the strap element adjacent the head end portion of the shank includes an upwardly projecting neck portion integrally connecting the head to the shank.

3. A fastener in accordance with claim 1, wherein the connecting element adjacent the shank entering end is axially spaced from the entering extremity of the shank to provide a bifurcated shank entering end.

4. A fastener in accordance with claim 1, wherein said shank sections at their entering ends are formed as a pair of part-spherical portions spaced by a continuation of the longitudinal slot between said sections.

OUGLJESA JULES POUPITCH.

REFERENCES CITED

The following references are of record in the file of this patent:

UNITED STATES PATENTS

| Number | Name | Date |
|---|---|---|
| 256,117 | Bray | Apr. 11, 1882 |
| 1,007,334 | Carlson | Oct. 31, 1911 |
| 1,056,452 | Remhilt | Mar. 18, 1913 |
| 1,978,087 | Johnson | Oct. 23, 1934 |
| 2,110,959 | Lombard | Mar. 15, 1938 |
| 2,130,597 | Oldham | Sept. 20, 1938 |
| 2,267,873 | Place | Dec. 30, 1941 |
| 2,438,499 | Hartman | Mar. 30, 1948 |

FOREIGN PATENTS

| Number | Country | Date |
|---|---|---|
| 813,517 | France | Mar. 1, 1937 |
| 537,162 | Great Britain | June 11, 1941 |